US012388387B2

(12) United States Patent
Soares et al.

(10) Patent No.: US 12,388,387 B2
(45) Date of Patent: Aug. 12, 2025

(54) METHOD OF ACCELERATED EXTINGUISHING OF RESIDUAL CURRENT AND METHOD OF DURATION CONTROL OF THE METHOD OF ACCELERATED EXTINGUISHING OF RESIDUAL CURRENT

(71) Applicant: NIDEC GLOBAL APPLIANCE BRASIL LTDA., Joinville—SC (BR)

(72) Inventors: Claudio Eduardo Soares, Joinville—SC (BR); Roberto Andrich, Joinville—SC (BR); Andre Dering, Joinville—SC (BR)

(73) Assignee: NIDEC GLOBAL APPLIANCE BRASIL LTDA., Joinville—SC (BR)

( * ) Notice: Subject to any disclaimer, the term of this patent is extended or adjusted under 35 U.S.C. 154(b) by 46 days.

(21) Appl. No.: 18/253,696

(22) PCT Filed: Nov. 23, 2021

(86) PCT No.: PCT/BR2021/050511
§ 371 (c)(1),
(2) Date: May 19, 2023

(87) PCT Pub. No.: WO2022/109701
PCT Pub. Date: Jun. 2, 2022

(65) Prior Publication Data
US 2024/0007041 A1    Jan. 4, 2024

(30) Foreign Application Priority Data

Nov. 25, 2020    (BR) ...................... 10 2020 024059 5

(51) Int. Cl.
*H02P 6/182*    (2016.01)
*H02P 27/08*    (2006.01)
(52) U.S. Cl.
CPC ................................. *H02P 27/085* (2013.01)

(58) Field of Classification Search
CPC .. H02P 6/18; H02P 6/182; H02P 6/185; H02P 6/20; H02P 27/085
(Continued)

(56) References Cited

U.S. PATENT DOCUMENTS 5,486,743 A * 1/1996 Nagai ...................... H02P 6/085
                                                       318/400.06
9,479,090 B2 * 10/2016 Ogawa ...................... H02P 6/17
(Continued)

FOREIGN PATENT DOCUMENTS

EP        0 553 354 A1    8/1993
EP        0 945 974 A2    9/1999
(Continued)

OTHER PUBLICATIONS

International Search Report dated Mar. 3, 2022 issued in International Application No. PCT/BR2021/050511, 4 pages.
(Continued)

*Primary Examiner* — Gabriel Agared
(74) *Attorney, Agent, or Firm* — FOLEY & LARDNER LLP

(57) ABSTRACT

Method of accelerated extinguishing of residual current of a phase that opens when changing an electric position during the driving of a BLDC motor (10), under high load conditions, comprising:
using the unipolar pulse width modulation pattern ON_PWM to drive the BLDC motor (10);
determining if there is residual current by means of monitoring the voltage of the phases that opens using a voltage observer (40);
while there is residual current, applying a switching pattern, on the switches ($S_1$-$S_6$) of the BLDC motor (10), which superimposes the pulse width modulation pattern used and maximizes the voltage in the open phase for the accelerated extinguishing of said residual current, (Continued)

said switching pattern comprising:
opening the switch of the phase maintained driven when changing the electrical position; and
closing the switch related to the phase that was driven when changing the electric position.

14 Claims, 13 Drawing Sheets

(58) Field of Classification Search
USPC .................................................. 318/400.17
See application file for complete search history.

(56) References Cited

U.S. PATENT DOCUMENTS

| | | | | |
|---|---|---|---|---|
| 2013/0300329 | A1* | 11/2013 | Jeske | H02P 6/182 |
| | | | | 318/400.34 |
| 2015/0028781 | A1* | 1/2015 | Steigerwald | H02P 27/08 |
| | | | | 318/400.2 |
| 2020/0127587 | A1* | 4/2020 | Roemmelmayer | H02P 6/26 |

FOREIGN PATENT DOCUMENTS

| | | |
|---|---|---|
| EP | 2 622 731 A2 | 8/2013 |
| EP | 3 343 751 A1 | 7/2018 |
| GB | 2 272 808 A | 5/1994 |
| WO | WO-2012/040805 A2 | 4/2012 |

OTHER PUBLICATIONS

Lai, Yen-Shin, et al., "Novel PWM technique without causing reversal DC-link current for brushless DC motor drives with bootstrap driver", 2013 IEEE Industry Applications Society Annual Meeting, [Online], vol. 3, Jan. 1, 2005, p. 2182, XP055894072, ISSN: 0197-2618, DOI: 10.1109/IAS.2005.1518749 , Retrieved from the internet: URL: https://ieeexplore.ieee.org/stampPDF/getPDF.jsp?tp=&arnumber=1518749&ref=aHR0cHM6Ly9pZWVIeHBsb3JlLm11ZWUub3JnL2RvY3VtZW50LZE1MTg3NDk=> [retrieved on Feb. 21, 2022].

Written Opinion of the International Searching Authority dated Mar. 3, 2022 issued in International Application No. PCT/BR2021/050511, 6 pages.

* cited by examiner

METHOD OF ACCELERATED EXTINGUISHING OF RESIDUAL CURRENT AND METHOD OF DURATION CONTROL OF THE METHOD OF ACCELERATED EXTINGUISHING OF RESIDUAL CURRENT

CROSS-REFERENCE TO RELATED APPLICATIONS

This application is a national stage entry of PCT Application No. PCT/BR2021/050511, filed on Nov. 23, 2021, which claims priority to Brazilian Application No. 10 2020 024059 5, filed on Nov. 25, 2020, the contents of all of which are incorporated herein by reference in their entireties.

TECHNICAL FIELD

The present invention refers to refrigerator compressors comprising a brushless direct current three phase motor (BLDC), having trapezoidal-shaped induced voltages.

More specifically, the present invention refers to a method of accelerated extinguishing of residual current and method of duration control of the method of accelerated extinguishing of residual current, during the driving of a BLDC motor, under high load conditions.

BACKGROUND OF THE INVENTION

The typical driving procedure of a BLDC motor via a three-phase inverter is known as "six-steps", being divided into six electrical positions. In this type of driving, only two phases of the motor are commanded in each electrical position, while the third one remains open and is used to carry out the monitoring of an induced voltage in the motor coils and, consequently, the identification of the electrical position of the motor.

FIG. 1 of the prior art depicts the electronic circuit when driving a three-phase BLDC motor 10.

As can be noted in FIG. 1, said circuit comprises an electrical power supply 20 which provides direct current/voltage. The power supply 20 can be provided by a converter stage at the entrance, such as a capacitive filter rectifier or a DC-DC converter powered by a battery. In addition, the circuit comprises a three-phase voltage inverter 30 associated operatively with the BLDC motor 10 and with the power supply 20; thus, the power supply 20 is configured to provide a continuous busbar voltage $V_{cc}$ from the definition of a reference voltage $V_{ref}$ at the lower part of the voltage inverter 30.

Still according to FIG. 1, the voltage inverter 30 comprises switches $S_1$-$S_6$ configured to energize the phases Fa, $F_b$ and $F_c$ of the BLDC motor 10. In addition, the voltage inverter comprises freewheel diodes $D_1$-$D_6$, wherein each freewheel diode $D_1$-$D_6$ is associated in parallel with each one of the switches $S_1$-$S_6$. The freewheel diodes $D_1$-$D_6$ are able to provide a path for the current of the BLDC motor 10 during the operation of the switches $S_1$-$S_6$. Therefore, the switches $S_1$ and $S_2$ are associated with the phase $F_a$, the switches $S_3$ and $S_4$ are associated with phase $F_b$ and the switches $S_5$ and $S_6$ are associated with the phase $F_c$ of the BLDC motor 10.

According to FIG. 1, the circuit also comprises a voltage observer 40, responsible for measuring the three phase voltages $V_a$, $V_b$ and $V_c$ relating to phases $F_a$, $F_b$ and $F_c$ of the BLDC motor 10 and the busbar voltage $V_{cc}$. Additionally, the circuit comprises a control unit 50, operatively associated with the voltage observer 40, responsible for interpreting the voltage signs, identifying the present electric position of the BLDC motor 10 and carrying out the correct driving of the voltage inverter.

Still according to FIG. 1, only one current sensor 60 is used in the busbar for controlling the motor current or for protecting against overcurrent, as ideally only two phases of the motor are driven at each electric position and, in this case, the motor current would be equal to the current circulating through the busbar.

FIG. 2 of the prior art depicts the induced voltage waveforms $e_a$-$e_c$, phase voltage $V_a$-$V_c$, desired current $I_a$-$I_c$ and the command signs of the switches $S_1$-$S_6$ during the typical driving, known as "six-steps" of a BLDC motor 10 having trapezoidal waveform. Additionally, the induced voltage waveforms $e_a$-$e_c$ are represented with a vertical displacement of Vcc/2 so that they can superimpose the phase voltages $V_a$, $V_b$ and $V_c$ in the moments the phases $F_a$, $F_b$ and $F_c$ are open, respectively. Still according to FIG. 2, the "six-step" driving is divided into six electrical positions P1-P6 of 60° electrical, totaling 360° electrical. According to FIG. 2, when one of the switches S1-S6 is driven, said switch should operate for 120° electrical. As previously mentioned, such typical driving can be separated into six electrical positions $P_1$-$P_6$, wherein, in each electrical position, only two phases of the BLDC motor 10 are driven at a time, the third phase being used for monitoring the BEMF induced voltage of the BLDC motor 10 and, by means of the monitoring of such BEMF induced voltage, detect the electrical position of the BLDC motor 10.

In this sense, one of the challenges related to driving a BLDC motor operating with high loads is the preservation of its electrical position sensing. The typical driving of BLDC motors with no mechanical sensor is based on measuring the induced voltage (BEMF) which is measured in the open phase, but such voltage is only visible when there is no longer current circulating at said open phase. Thus, if the current takes long to be extinct, a failure in the electrical position sensing may take place, due to masking of the induced voltage (BEMF) by the residual current, leading to a failure in driving.

Thus, the electric position of a BLDC motor 10 may be estimated in various ways, the more common techniques being the detection by zero crossing and the detection of crossing of the induced voltages.

FIG. 3 of the prior art depicts the operation of such two techniques, wherein the circle represents the detection by zero crossing and the trapezoid represents the detection of the crossing of induced voltages.

In addition, it is important to highlight that, in these techniques, the monitoring of the induced voltage in the open phase is affected by the residual current coming from the previous electrical position, when the phase was still being driven and the current was circulating. Such residual current circulates by the freewheel diodes forcing the voltage in the open phase in $V_{cc}$ or zero and, thus, masking the induced voltage.

For example, FIG. 4A of the prior art depicts the voltage clamp in the open phase in the busbar voltage $V_{cc}$ of the voltage inverter 30, such clamp takes place when the current was leaving by $F_b$ of the BLDC motor 10 at the previous electrical position, and circulates by the top freewheel diode $D_3$ until its complete extinction.

FIG. 4B of the prior art depicts how the electrical magnitudes current applied $I_b$, induced voltage $e_b$ and read voltage $V_b$ operate, associated to phase B of the BLDC motor 10, when changing an electrical position.

For example, FIG. 5A of the prior art depicts the voltage clamp of the open phase in reference to the inverter bridge, such clamp takes place when the current was entering phase B of BLDC motor 10 in the previous electric position, and then starts to circulate by the lower freewheel diode $D_4$ until its complete extinction.

FIG. 5B depicts how the electrical magnitudes applied current $I_b$, induced voltage $e_b$ and read voltage $V_b$ operate, associated with phase B of the BLDC motor 10, during change of an electrical position.

Additionally, the driving techniques of BLDC motors with no mechanical sensor contain operating steps to filter the impacts of the residual current on the reading of the induced voltage BEMF, to allow the adequate working of the electrical position sensing.

For example, the patent document PI0004062-2, entitled "ELECTRIC MOTOR CONTROL METHOD, ELECTRIC MOTOR CONTROL SYSTEM and ELECTRIC MOTOR", published on Apr. 16, 2002, proposes a minimum protecting time, after each change of electrical position, before activating the processing of the induced voltage BEMF by the electrical position sensing.

The patent document U.S. Pat. No. 6,512,341 (B2), entitled "APPARATUS AND METHOD OF DRIVING A BRUSHLESS MOTOR", published on Mar. 14, 2002, monitors if the voltage read is clamped on the busbar voltage or in the reference of the inverter bridge before activating the processing of the induced voltage BEMF by the electrical position sensing.

Nevertheless, none of the above-mentioned techniques provide a type of action to preserve the electrical position sensing under high load conditions, such conditions where the current can take too long to extinguish itself, causing loss of the ideal instant of shifting the driving switches and can lead to a driving failure of the BLDC motor.

For example, FIGS. 6A and 6B of the prior art exemplify the loss of zero crossing due to the extension of the current until its extinction. It is important to highlight that such problem does not limit the techniques for detecting zero crossing, but to any technique that depends on monitoring the induced voltage in the open phase. Additionally, such Figures depict how the electrical magnitudes applied current $I_b$, induced voltage $e_b$ and read voltage $V_b$ operate, associated to $F_b$ of the BLDC motor 10, during the loss of crossing by zero.

More specifically, FIG. 6A exemplifies the case of clamp of the open phase voltage in the busbar voltage $V_{cc}$, while FIG. 6B exemplifies the clamp of the voltage of the open phase in zero, that is, in the reference voltage $V_{ref}$ of the inverter bridge, causing the masking of the induced voltage and loss of zero crossing.

Additionally, there are several patterns of pulse width modulation for driving BLDC motors, such as the patterns analyzed in the article "Assessment of Pulse-Width Modulation Techniques for Brushless DC Motor Drives" by LAI, Y.-S. and LIN, Y.-K. Published in 2006 at the *Conference Record of the 2006 IEEE Industry Applications Conference Forty-First IAS Annual Meeting*, wherein the differences between such patterns consist of: possibility of circulating the residual current by DC busbar, duration of the residual current and restrictions of the driving circuit of the driving switches.

The document JP2017046513 entitled "MOTOR DRIVE DEVICE, DRIVE DEVICE OF COMPRESSOR USING THE SAME, AND FREEZING DEVICE, REFRIGERATOR", published on Mar. 2, 2017, describes the application of an alternate unipolar switching pattern, wherein the pulse-width modulation is applied alternately, once on the top switch and then in the lower switch and always associated to the phase maintained at the last change in position. Such alternate switching pattern provides a faster disposal of the current in the phase that was open, thus improving the position sensing and the operation under high load conditions. Said document also mentions the use of such invention in applications where there is a block valve to prevent the equalization of the system, that is, it was developed for applications with non-equalized start. However, it is important to highlight the alternated switching pattern and associated to the phase maintained when changing the position, described in the document JP2017046513, was already used in the article "Four-quadrant sensorless brushless ecm drive" by BECERRA, R. C. et al published in 1991 in the Proc. Sixth Annual Applied Power Electronics Conf and Exposition APEC'91.

The document JP2017046512, entitled "MOTOR DRIVE DEVICE, DRIVE DEVICE OF COMPRESSOR USING THE SAME, FREEZING DEVICE AND REFRIGERATOR", published on Mar. 2, 2017, describes a switching pattern with the aim of carrying out the return of the freewheel currents by the busbar capacitor. In this document it is proposed the turning off for a certain time the switch associated to the phase that was kept driven after changing the position of the motor, so as to force the passage of the freewheel current of the phase that was open by the busbar and, thus, accelerate the extinction of the freewheel current, so that the position sensing is not precluded under high load condition. The document still mentions the use of this invention in applications where there are block valves to prevent the system equalization, that is, it was developed for applications with non-equalized start.

A problem of the prior art consists of the fact that the acceleration of the extinction of the residual current does not depend directly on the return of such current by the busbar capacitor, but on the bigger reverse voltage that can be applied in the phase where said residual current circulates.

The conceptual difference is more evident when attempting to associate the proposed method for the return of the residual current by the busbar capacitor with the typical switching techniques for controlling the BLDC motor, such as the association represented in FIG. 2 of the patent JP2017046512 (represented on the upper part of FIG. 8 of this document). As it will be demonstrated later, the opening of two switches due to the association of the proposed method in the patent JP2017046512 with the unipolar switching applied to the upper switches, reduces the effectiveness of accelerating the extinction of the residual current, in spite of the residual current carry on returning by the busbar capacitor.

To show the problems of patent JP2017046512, it is important to note that the current in each phase of the BLDC motor 10 can be defined from the diagram depicted in FIG. 1, according to the equations below:

$$\begin{cases} L\dfrac{d}{dt}i_a = -Ri_a - e_a + (v_a - v_n) \\ L\dfrac{d}{dt}i_b = -Ri_b - e_b + (v_b - v_n) \\ L\dfrac{d}{dt}i_c = -Ri_c - e_c + (v_c - v_n) \end{cases}$$

Wherein L represents the inductance, R the resistance, $e_a$, $e_b$ and $e_c$ the induced voltages, $v_a$, $v_b$ and $v_c$ the phase voltages in the terminals of the BLDC motor 10, $v_n$ the voltage resulting in the neutral point, $i_a$, $i_b$ and $i_c$ the phase currents and $di_a/dt$, $di_b/dt$ and $di_c/dt$ the derivatives of the phase current.

Additionally, the voltage in the neutral point Vn can be modelled from the equations above, considering a symmetric motor, that is, the resistances R and the phases inductances L are all the same, in such a way that:

$$v_n = \frac{1}{3}(v_a + v_b + v_c) - \frac{1}{3}(e_a + e_b + e_c)$$

Thus, it is possible to rewrite the dynamic of the currents separating the dynamic of the BLDC motor 10 from the controlling action according to the equations below:

$$L\frac{d}{dt}i_a = \left[-Ri_a - e_a + \frac{1}{3}(e_a + e_b + e_c)\right] + \left[v_a - \frac{1}{3}(v_a + v_b + v_c)\right]$$

$$L\frac{d}{dt}i_b = \left[-Ri_b - e_b + \frac{1}{3}(e_a + e_b + e_c)\right] + \left[v_b - \frac{1}{3}(v_a + v_b + v_c)\right]$$

$$L\frac{d}{dt}i_c = \left[-Ri_c - e_c + \frac{1}{3}(e_a + e_b + e_c)\right] + \left[v_c - \frac{1}{3}(v_a + v_b + v_c)\right]$$

Wherein the first portion between brackets on the right side of the equation represents the dynamic of the BLDC motor, and the second portion between brackets represents the controlling action in each phase, according to the voltage applied on each phase of the BLDC motor.

Thus, the controlling action can be defined by the equations below:

$$u_a = v_a - \frac{1}{3}(v_a + v_b + v_c) = v_a - u_q$$

$$u_b = v_b - \frac{1}{3}(v_a + v_b + v_c) = v_b - u_n$$

$$u_c = v_c - \frac{1}{3}(v_a + v_b + v_c) = v_c - u_q$$

$$u_n = \frac{1}{3}(v_a + v_b + v_c)$$

Wherein $u_a$, $u_b$ and $u_c$ represent the controlling action in each phase and $u_n$ the controlling action on the neutral point, all in function of the voltages $v_a$, $v_b$ and $v_c$ applied on the terminals of the motor.

Thus, it is possible to control the currents in phases of the BLDC motor by means of controlling the phase voltages.

For example, to increase the current $i_a$ it is possible to increase $V_a$ or even decrease the average voltage of the controlling action at the neutral point $u_n$. To decrease the current $i_a$ it is possible to decrease $v_a$ or even increase the average voltage of the controlling action over the neutral point $u_n$. Such analysis allows a better understanding for extinguishing the residual current.

In this sense, consider the classical six-step driving of a BLDC motor, wherein the transition for the electric position $P_1$ will be analyzed, as depicted in FIG. 7 of the prior art. To carry out the transition to the electric position $P_1$, the switch $S_4$ is kept closed, the switch $S_1$ is closed and the switch $S_5$ is open. When opening the switch $S_5$, a residual current $i_c$ begins to traverse the freewheel diode $D_6$.

According to FIG. 7, as it is desired that $i_a$ be positive and $i_b$ be negative, the major voltage in phase A and the minor voltage in phase B are applied, that is, the switches $S_1$ and $S_4$ are driven.

Besides, as there is still residual current at the newly opened phase C, such current circulates the freewheel diode $D_6$.

Thus, the average voltage of the controlling action over the average point $u_n$ for such classical driving pattern, is given by the equation below:

$$u_n = \frac{1}{3}(v_a + v_b + v_c) = \frac{1}{3}(V_{cc} + 0 + 0) = \frac{1}{3}V_{cc}$$

wherein, $V_{cc}$ is the value of the busbar voltage.

In addition, the voltage applied of the controlling action in each phase can be calculated by the set 1 of equations below:

$$\begin{cases} u_a = V_{cc} - \frac{1}{3}V_{cc} = +\frac{2}{3}V_{cc} \\ u_b = 0 - \frac{1}{3}V_{cc} = -\frac{1}{3}V_{cc} \\ u_c = 0 - \frac{1}{3}V_{cc} = -\frac{1}{3}V_{cc} \end{cases} \quad \text{Set 1}$$

wherein $i_c$ positive and $i_b$ negative, and still having as objective that $i_a$ assumes the current of $i_c$, this is a good option for maintaining the torque during the change of electric position, as it favors the fast increase of $i_a$ and the maintenance of the current $i_b$. However, under high load conditions, it can take too long for $i_c$ be extinct.

The solution proposed by the patent JP2017046512 consists of carrying out the return of the freewheel current by the busbar capacitor. In this sense, it is proposed turning off for a certain time the switch associated to the phase that was kept driven, such as depicted in FIG. 8. Thus, to carry out the transition for the electric position $P_1$, the switch $S_4$ is open for a certain time to force the return of the current $i_c$ by the busbar capacitor.

The problem in the prior art is evident when associating a pulse width modulation pattern to phase A, to allow the control of the voltage applied on the BLDC motor 10 while forcing the extinction of the current, such as suggested in the description of patent JP 2017046512 and in FIG. 2 of the same patent. Such association can lead to the opening of two switches associated to the position, which is bad both for extinguishing the residual current and for stablishing the new driving electric position.

During the opening of the switch $S_1$, due to the association of the pulse width modulation, such as represented in FIG. 8, the current $i_A$ would flow through the freewheel diode $D_2$, connecting phase A to the reference of the inverter bridge.

In this scenario, the average voltage of the controlling action on the average point $u_n$ for such driving pattern can be represented by the equation below:

$$u_n = \frac{1}{3}(v_a + v_b + v_c) = \frac{1}{3}(0 + V_{cc} + 0) = \frac{1}{3}V_{cc}$$

In addition, the voltage applied on each phase can be represented by the set 2 of equations below:

$$\begin{cases} u_a = 0 - \frac{1}{3}V_{cc} = -\frac{1}{3}V_{cc} \\ u_b = V_{cc} - \frac{1}{3}V_{cc} = +\frac{2}{3}V_{cc} \\ u_c = 0 - \frac{1}{3}V_{cc} = -\frac{1}{3}V_{cc} \end{cases} \quad \text{Set 2}$$

When comparing set 1 of equations with set 2, it is clear that the voltage $u_c$ applied to phase C, in the document JP2017046512, would be equal to the voltage applied in the classical driving, that is, would not accelerate the extinction of the residual current. In addition, both current $i_b$ and current is would be significantly reduced, impairing the BLDC motor torque at the moment of changing the electric position.

Another prior art problem is the fact that a residual current duration monitoring is not performed to know for how long the technique to reduce the freewheel current extinction time should be applied.

SUMMARY

An objective of the present invention consists of providing a method of accelerated extinguishing of residual current that avoids the drawbacks of the prior art.

Method of accelerated extinguishing of residual current of a phase that opens when changing an electric position during the driving of a BLDC motor (10), under high load conditions, comprising:
  using the unipolar pulse width modulation pattern ON_PWM to drive the BLDC motor;
  determining if there is residual current by means of monitoring the voltage of the phase that opens using a voltage observer;
  while there is residual current, applying a switching pattern, on the switches of the BLDC motor, that superimpose the pattern of pulse width modulation used and maximizes the voltage in the open phase for accelerated extinction of said residual current,
  said switching pattern comprising:
  opening the switch of the phase maintained driven during the change of the electric position; and
  closing the switch related to the phase that was driven during the change of the electric position.

One advantage of this invention consists of extinguishing the residual current of the phase that opens, under high load conditions, in a faster way than the prior art.

Conveniently, the method according to the present invention consists of the fact that while there is residual current leaving the phase that opens by an upper freewheel diode, the voltage read by the voltage observer, of the phase that opens, will be near the busbar voltage and the switching pattern for the accelerated extinguishing of the residual current is applied.

The method according to the present invention still consists of the fact that while there is residual current entering through the phase that opens by a lower freewheel diode, the voltage read by the voltage observer, of the phase that opens, will be near zero and the switching pattern for the accelerated extinguishing of the residual current is applied.

In addition, the method according to the present invention consists of the fact that the monitoring of the residual current must be conducted until the complete extinction of such current.

Still, the method according to the present invention consists of the fact that the unipolar pulse width modulation pattern ON_PWM can be replaced by any other unipolar or bipolar pulse width modulation pattern.

One additional advantage of the method according to the present invention consists of preserving the sensing of the position of the effect caused by the open phase residual current. Another advantage would be to enable the adequate operation of the technique preventing its disturbance by the association of the pulse width modulation.

The present invention also provides a method of duration control of the method of accelerated extinguishing of residual current, comprising of:
  adjusting a time interval of accelerated extinguishing of residual current for protecting the electric position sensing.

Conveniently, the method according to the present invention consists of the fact that the time interval of accelerated extinguishing of residual current required depends on a window time interval for reading the induced voltage, a minimum window time interval and a time interval of residual current extinguishing.

The method according to the present invention also consists of the fact that the window time interval for reading the induced voltage consists of a time interval comprised by the moment wherein a residual current is extinguished up to the moment wherein an electric position of the BLDC motor is detected.

Further, the method according to the present invention consists of the fact that the time interval of residual current extinguishing consists of the time interval comprised by the moment wherein the BLDC motor changes the electric position, and thus a residual current in the phase that opens of said BLDC motor is generated, up to the moment wherein such residual current is extinguished.

Additionally, the method according to the present invention consists of the fact that the time interval of accelerated extinguishing of residual current can be saturated in its minimum value, that is, zero, and in its maximum value, that is, equal to the residual current extinguishing.

Still, the method according to the present invention consists of the fact that the minimum window time interval is defined and function of the minimum electric distance that is desired for a safe operation of the electric position sensing and the electric speed of the BLDC motor.

In addition, the method according to this invention consists of the fact that the increase or decrease of the time interval of accelerated extinguishing of residual current is defined comparing the minimum window time to the window time interval for reading induced voltage.

The method according to the present invention still consists of the fact that the application of the switching pattern for accelerated extinguishing of the residual current results in the reduction of the current in the phase maintained turned on during the change of position, avoiding limiting the protection of overcurrent in low speed done by only one current sensor in the busbar, promoting a more effective protection of the BLDC motor against overcurrents.

Additionally, the method according with this invention consists that in the beginning of the start of the BLDC motor, the time interval of accelerated extinguishing of residual current must be equal to the time of residual current extinguishing.

BRIEF DESCRIPTION OF THE DRAWINGS

The objectives and advantages of the present invention will become clearer through the following detailed description of the examples and non-limiting drawings presented at the end of this document.

DETAILED DESCRIPTION

For the adequate operation a BLDC motor 10 driven by the conventional six step strategy, with no mechanic position sensor, it is required that the residual current, circulating in the phase of the BLDC motor 10 that is open when changing the electric position, be extinct before the representative event of the next electric position of the BLDC motor 10, which can be the zero crossing, or the crossing of the phase voltages or even a voltage that enables phase anticipation.

Thus, an embodiment of the present invention provides a method of accelerated extinguishing of residual current, such method aims to adjust the switching pattern of the BLDC motor 10 with the aim of extinguishing faster the residual current in the open phase, seeking to reduce its impact in the currents of the two other phases.

For this to be possible, the method according to the present invention applies a switching pattern which generates the bigger voltage possible in the phase that was open, after changing the position, for the accelerated extinguishing of the residual current, instead of proposing a switching pattern that forces the passage of such current by the busbar.

Figure 9:
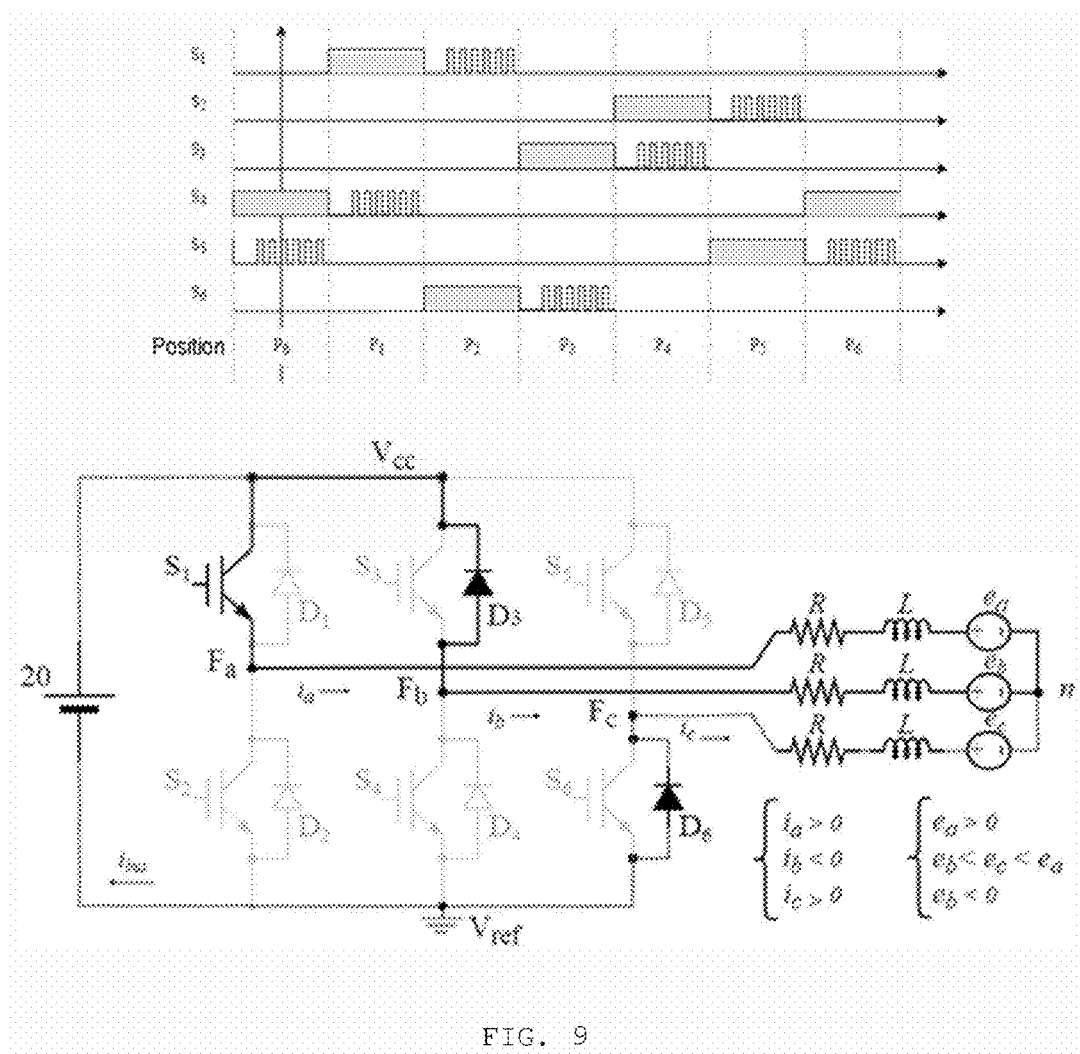
FIG. 9 depicts the transition to electric position $P_1$ in a driving with the method of accelerated extinguishing of residual current according to the present invention.

In this sense, according to FIG. 9 of the present invention, which also depicts the transition to electric position $P_1$, an option for faster extinguishing of the residual current $i_c$ consists of increasing the voltage resultant of the control action at the average point $u_n$, as $V_c$ is already at the minimum value.

Besides, as the voltage $V_a$ is already at the maximum value, connected to the busbar voltage $V_{cc}$, the best option for increasing $u_n$ consists of increasing $V_b$, connecting $V_b$ to the busbar voltage $V_{cc}$, such as shown in FIG. 9 of the present invention.

For this to be possible, in the method according to the present invention, while there is residual current, the pulse width modulation, applied on the switches associated to a certain electric position, is superimposed by a specific switching pattern for accelerated extinguishing of the residual current. According to the present invention, such switching pattern consists of opening the switch of the phase kept driven during the change of the electric position and closing the switch related to the phase that was driven during the change of the electric position. After the residual current is extinguished, the pulse width modulation chosen for the voltage control applied on the BLDC motor 10, is returned.

As can be noted in FIG. 9, in the transition into the electric position $P_1$, a switching pattern is applied, wherein the switch $S_4$, related to the phase B maintained driven, is open while there is residual current and, simultaneously, the switch $S_1$, related to phase A that was driven, is closed during the change into the electric position $P_1$.

Thus, the average voltage of the control action on the average point $u_n$ for the driving pattern using the method according to the present invention can be represented by the equation below:

$$u_n = \frac{1}{3}(v_a + v_b + v_c) = \frac{1}{3}(V_{cc} + V_{cc} + 0) = \frac{2}{3}V_{cc}$$

In addition, the voltage applied of the control action in each phase of the BLDC motor 10 can be calculated by the set 3 of equations below:

$$\begin{cases} u_a = V_{cc} - \frac{2}{3}V_{cc} = +\frac{1}{3}V_{cc} \\ u_b = V_{cc} - \frac{2}{3}V_{cc} = +\frac{1}{3}V_{cc} \\ u_c = 0 - \frac{2}{3}V_{cc} = -\frac{2}{3}V_{cc} \end{cases} \text{Set 3}$$

As can be noted in the set 3 of equations, in the method according to the present invention, the phase C voltage, newly opened, is the double when compared with the classical driving, which helps faster extinguishing of the residual current.

Figure 11:
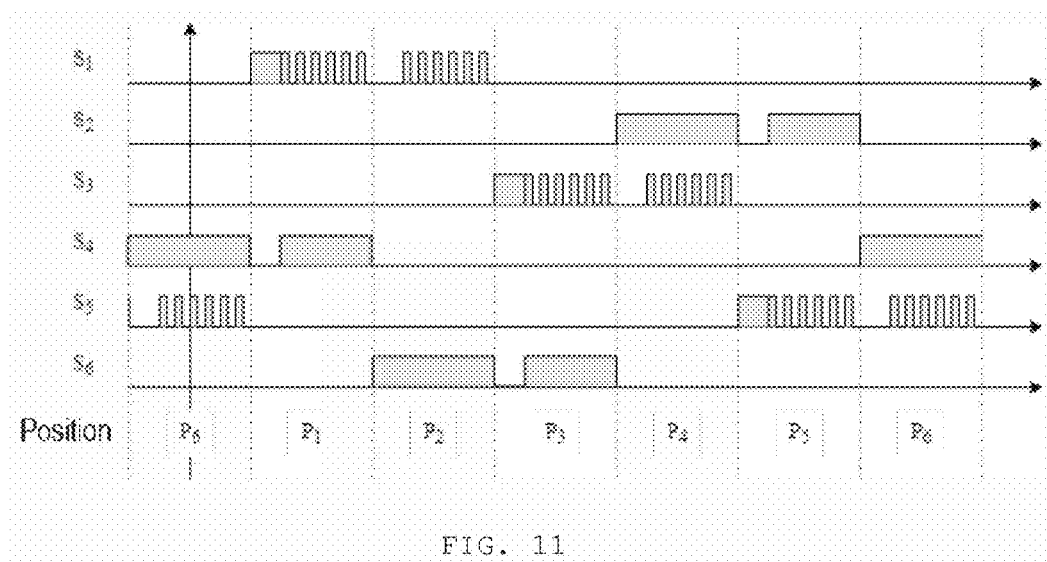
FIG. 11 depicts a driving with the method of accelerated extinguishing of residual current according to the present invention.

Another characteristic of the method according to the present invention is the fact that it can be associated to any pulse width modulation pattern for BLDC motors, both the unipolar type patterns and the bipolar type ones, provided that the switching pattern of the method according to present invention has priority and superimposes the pulse width modulation pattern while there is residual current. For example, the method according to this invention can be associated to the application of the pulse width modulation only on the upper switches $S_1$, $S_3$ and $S_5$, as it can be noted in FIG. 11. According to FIG. 11, it is possible to note that, during superimposition by the switching patter for a faster extinguishing of the residual current during the change of electric position, the switch related to the phase maintained driven is open while there is residual current and, simultaneously, the switch related to the phase that was driven is closed.

In spite of the possibility of associating will all the modulation patterns known, the pulse width modulation pattern preferably associated is the unipolar of the ON_PWM type. In this type of pattern, the pulse width modulation is applied only on the switch maintained driven during the change of electric position. Additionally, such pulse width modulation is applied only at the final 60° electrical of the switch operation, while at the initial 60° the switch is continuously kept turned on. Thus, it is possible to minimize the losses of switching and torque undulation, and also to privilege the position sensing at the final 30° electrical of certain electric position.

In the method according to the present invention, it is possible determine the application of the switching pattern for the accelerated extinguishing of the residual current of the open phase, by means of monitoring the phase voltages of the BLDC motor 10.

Figure 1:
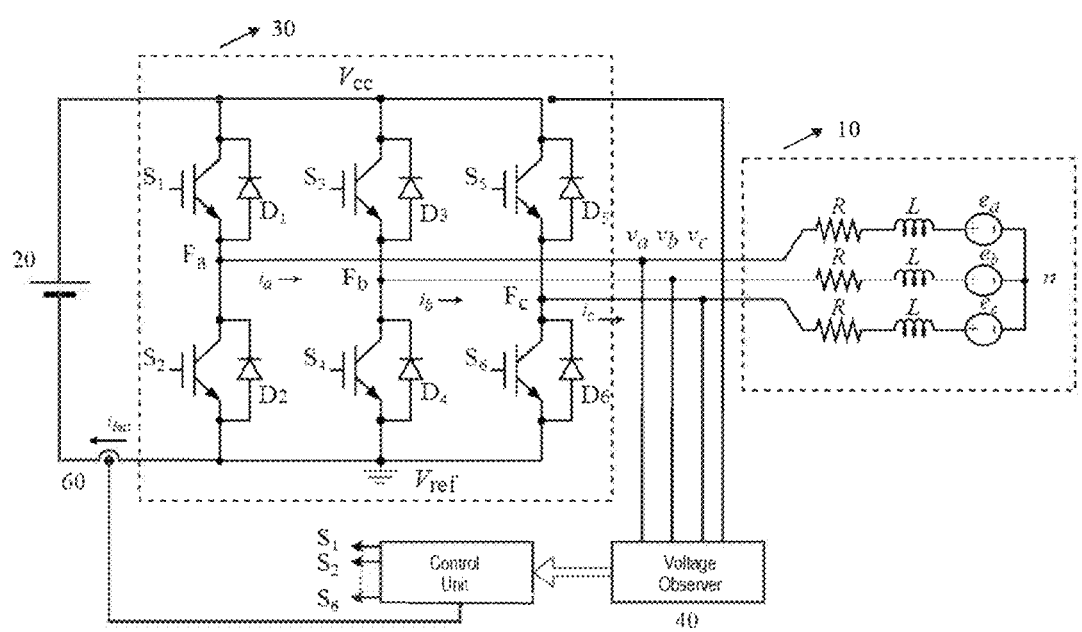
FIG. 1 depicts an electronic circuit used on the six-step driving of a BLDC motor of the prior art.
Figure 2:
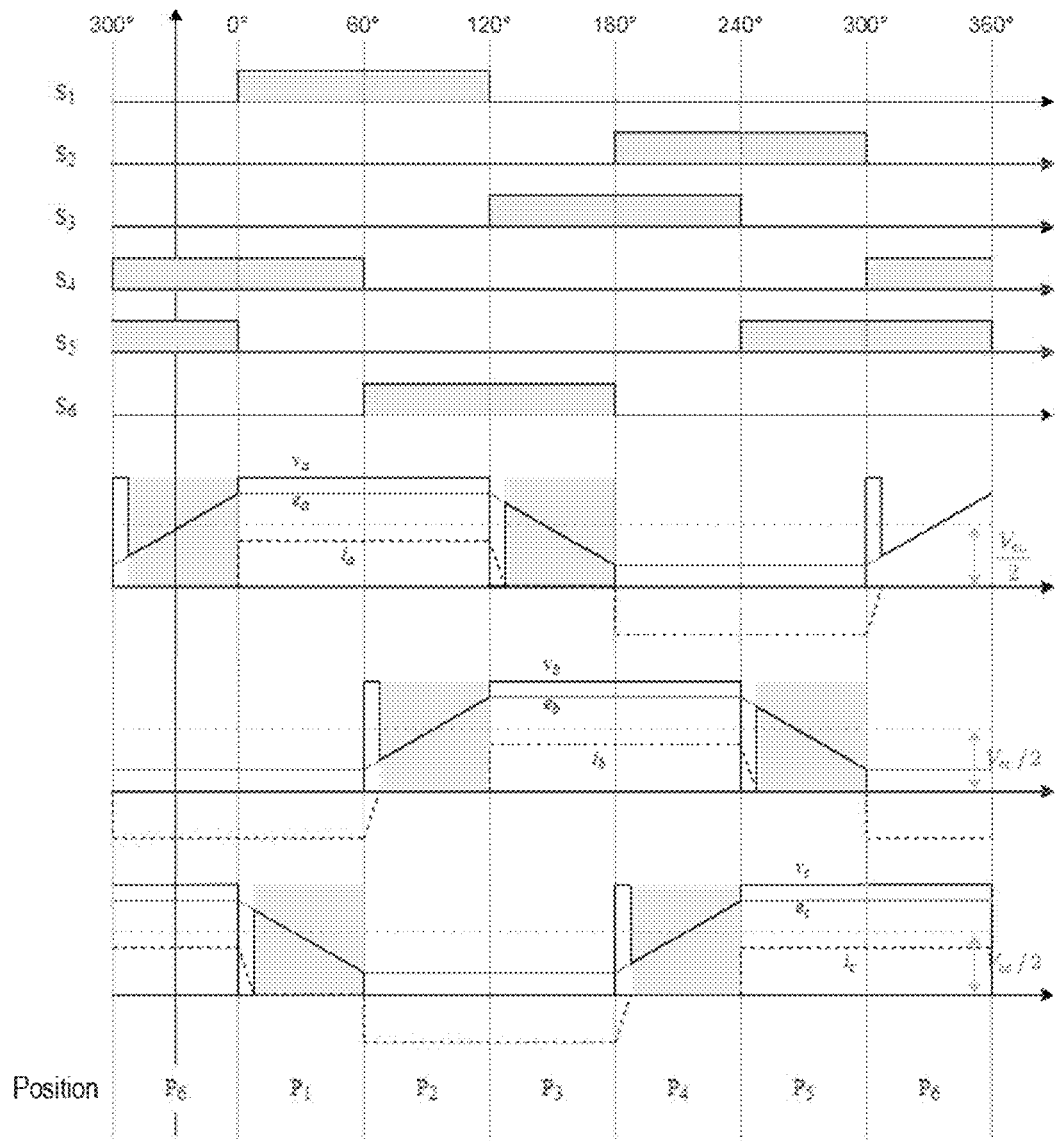
FIG. 2 depicts the induced voltage waveforms, of desired current, of phase voltage and command signs in a BLDC motor of the prior art.
Figure 3:
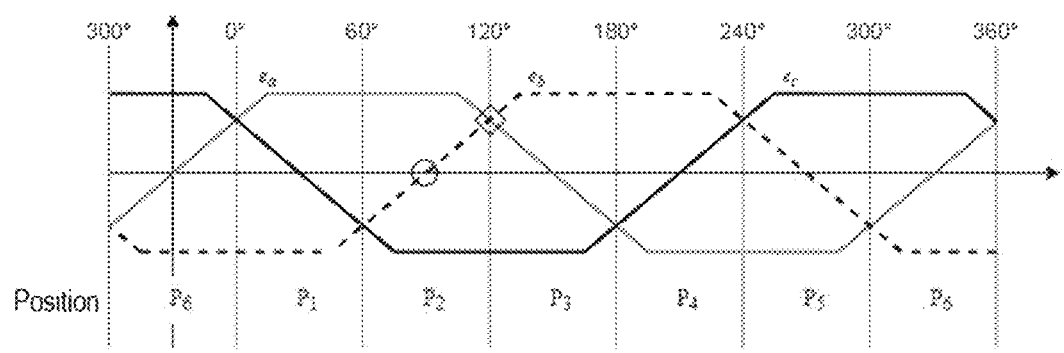
FIG. 3 depicts the techniques for detection by zero crossing or by crossing of the induced voltages of the prior art.
Figure 4A:
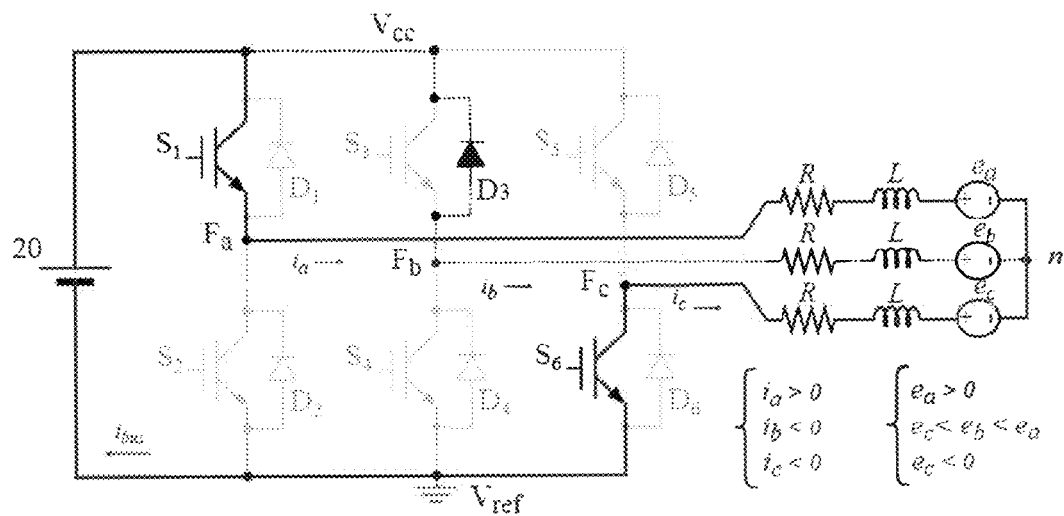
FIG. 4A depicts the output of the residual current by the upper freewheel diode of phase B of the prior art.
Figure 4B:
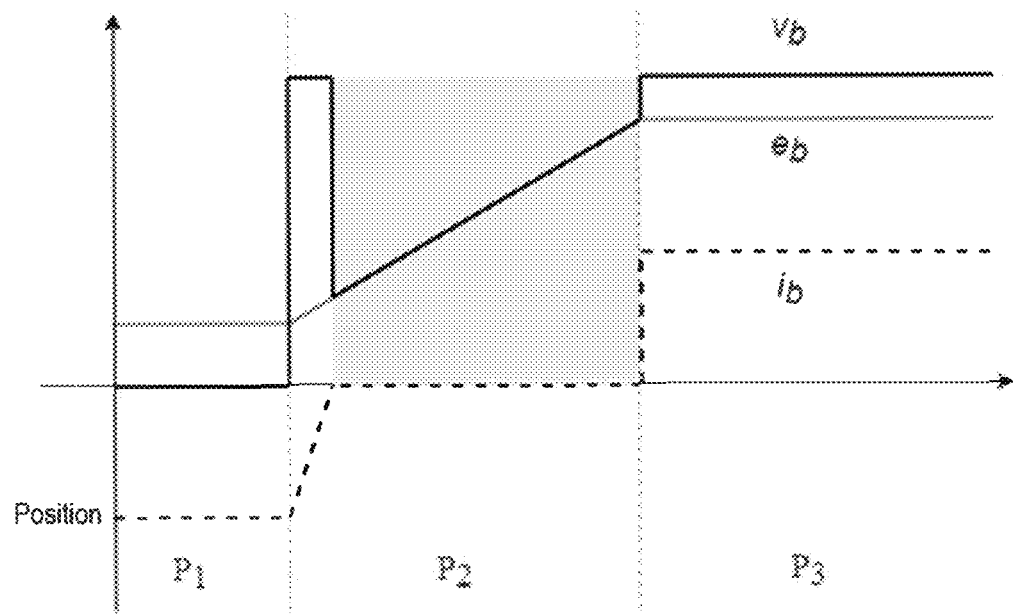
FIG. 4B depicts the clamp of the phase voltage at the busbar voltage of the inverter bridge when the residual current leaves the motor by the upper freewheel diode of phase B of the prior art.
Figure 5A:
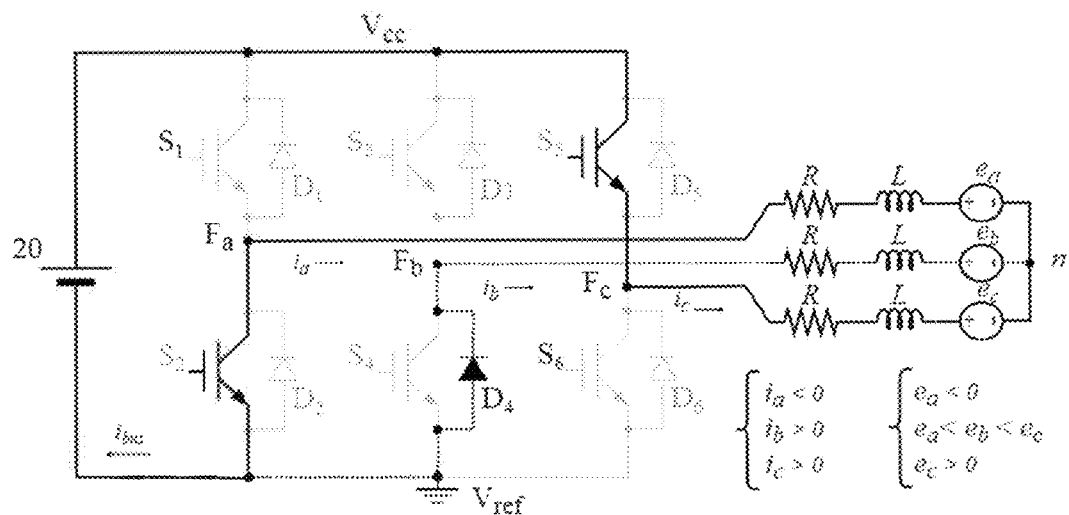
FIG. 5A depicts the input of the residual current by the lower freewheel diode of phase B of the prior art.

As depicted in FIG. 4A, when the residual current $i_b$ is leaving the BLDC motor 10 by the open phase B, the current circulates by the upper freewheel diode $D_3$ and connects the phase voltage to the busbar. Still, as depicted in FIG. 5A, when the residual current $i_b$ is entering into the BLDC motor 10 by the open phase B, said residual current $i_b$ circulates by the lower freewheel diode $D_4$ and connects the phase voltage to the reference of the inverter. Thus, it is possible to monitor, in an indirect way, the occurrence of the residual current by means of measuring the voltage, measured by a voltage observer 40, of the phase that opens of the BLDC motor 10.

Figure 10:
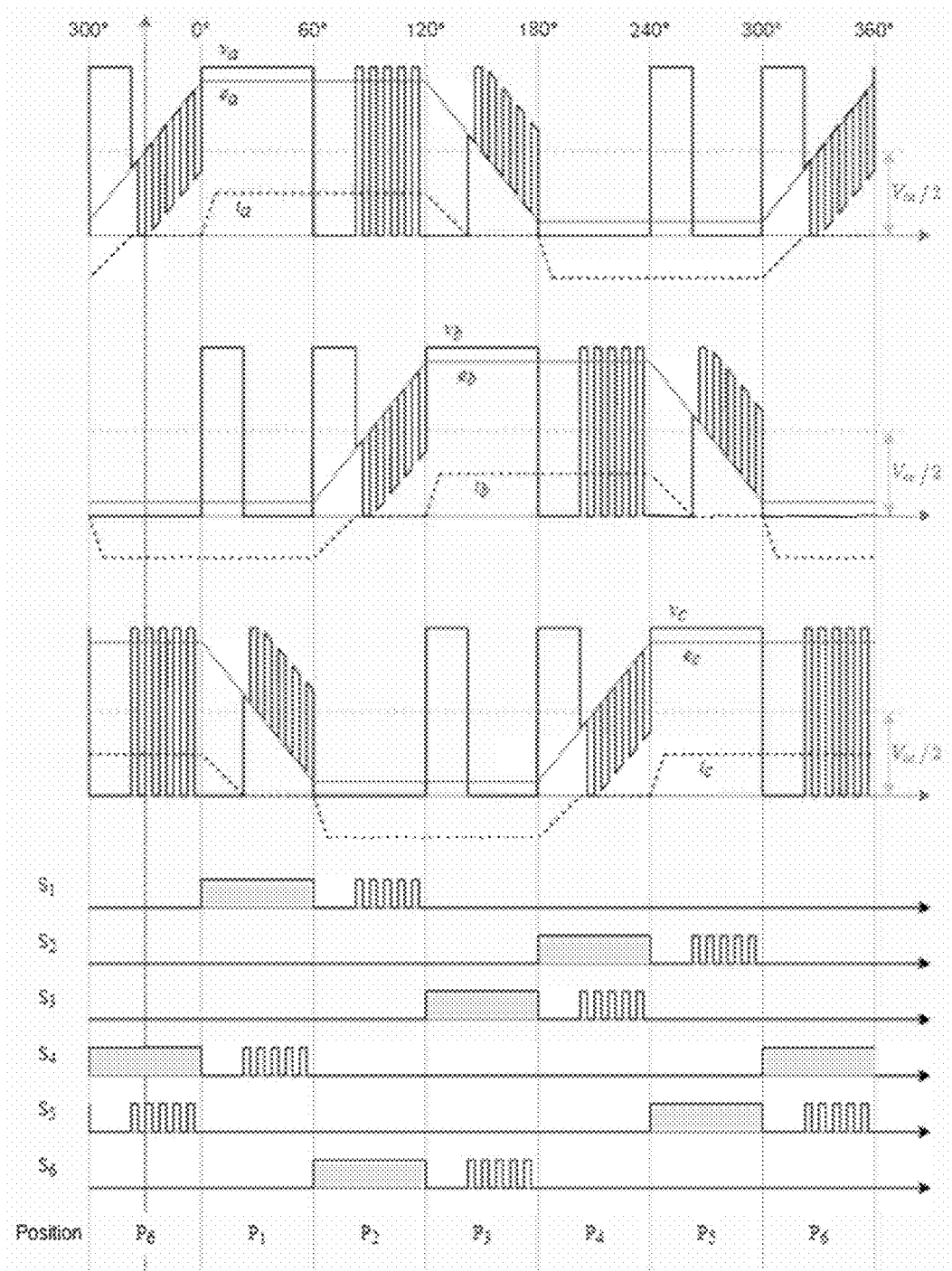
FIG. 10 depicts the phase voltages used for monitoring the occurrence of the residual current according to the present invention.

As can be noted in FIG. 10, the present invention seeks to monitor the occurrence of the residual current by means of the sensing of the phase voltages $V_a$, $V_b$, $V_c$ and the busbar voltage $V_{cc}$ and apply the switching pattern for accelerated extinguishing of the residual current while such current exists.

Thus, the voltage read by the voltage observer 40, in the phase that opens, must be near zero, or near the busbar voltage $V_{cc}$. Thus, while the voltage measured at the phase that opens is near zero or near the busbar voltage $V_{cc}$, there is still residual current circulating by the BLDC motor 10.

It is important to highlight that such monitoring must be carried out up to the complete extinguishing of said residual current.

A second embodiment of the present invention comprises a method of duration control of the method of accelerated extinguishing of residual current in order to protect the electrical position sensing. The duration of the method of accelerated extinguishing can be adjusted and even be cancelled when the electric position sensing can operate with no risk of failure.

Naturally, the duration time of such method can vary, depending on the type of application where it is used.

Figure 12A:
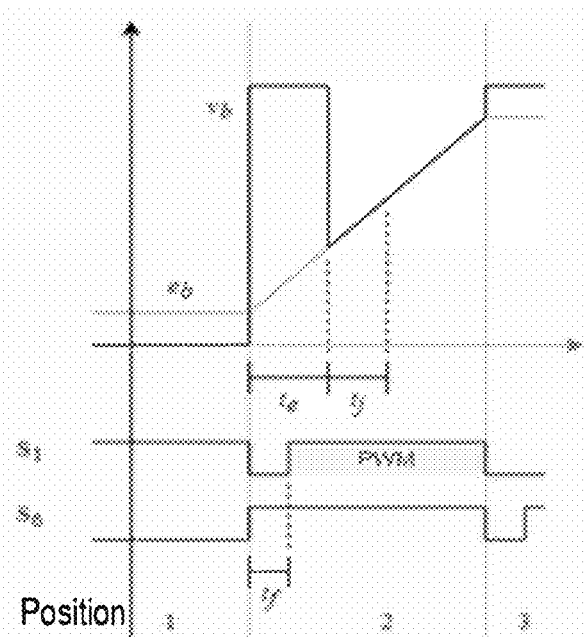
FIGS. 12A and 12B depict how the monitoring of the integrity of the electric position sensing of the BLDC motor is carried out according to the present invention.
Figure 12B:
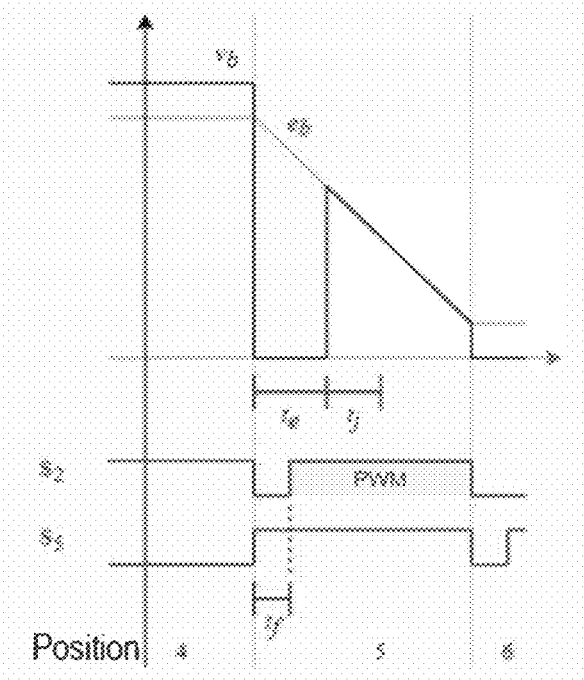

Such adjustment is possible, as can be observed in FIGS. 12A and 12B, by measuring the window time interval for reading the induced voltage $t_j$, a time interval of accelerated extinguishing of residual current $t_f$ and a time interval of residual current extinguishing $t_e$.

Said window time interval for reading the induced voltage consists of the time interval comprehended by the moment where the residual current is extinct until the moment where an electrical position of the BLDC motor is detected.

In addition, said time interval of accelerated extinguishing of residual current $t_f$ consists of the time interval comprehended by the moment where the BLDC motor 10 changes the electric position, and, thus, a residual current is generated in the phase that is open of said BLDC motor 10, until the moment where the accelerated extinguishing of residual current is no longer needed.

Moreover, the time interval of residual current extinguishing $t_e$ consists of the interval comprised by the moment where the BLDC motor 10 changes the electric position, and, thus, a residual current is generated in the phase that is open of said BLDC motor 10, until the moment where such residual current is extinct.

It is important to highlight that the time interval of accelerated extinguishing of residual current $t_f$ must be saturated in its minimum value, that is, zero, and in its maximum value, that is, equal to the time of residual current extinguishing te.

Besides, an adequate sensing of the electric position of the BLDC motor 10 requires a minimum desired time for the window time interval $t_{jmin}$. The minimum time of the window time $t_{jmin}$, in its turn, can be defined in function of a minimum electric distance desired and the speed of the motor, wherein:

$$t_{jmin} = \frac{\Delta\theta_{min}}{\omega_e}$$

wherein $\Delta\theta_{min}$ is the minimum electric distance that is desired for a safe operation of the electric position sensing, and $\omega_e$ the electric speed of the BLDC motor 10.

Thus, the increase or decrease of the time interval of accelerated extinguishing of residual current $t_f$ is defined comparing a desired window minimum time $t_{jmin}$ with the window time interval for reading the induced voltage $t_j$.

A possible practical application of the present invention has as objective to prevent the protection against overcurrent made by means of one only current sensor in the busbar is not effective during the change of the electric position, specially under de low-speed conditions such as in the start of the motor.

As shown in the article "Analysis of torque ripple due to phase commutation in brushless DC machines" by Carlson, R. et al published in 1992 at the IEEE Transactions on Industry Applications, the control via hysteresis controllers with only one sensor is not so effective during a change in the electric position.

The problem of using only one current sensor at the DC busbar is due to a limitation of such configuration in monitoring the current in the phase kept connected during a position change. This takes place because the current circulating by the current sensor after a position change is the current circulating by the connected phase, instead of the current in the phase maintained in the position change.

Figure 5B:
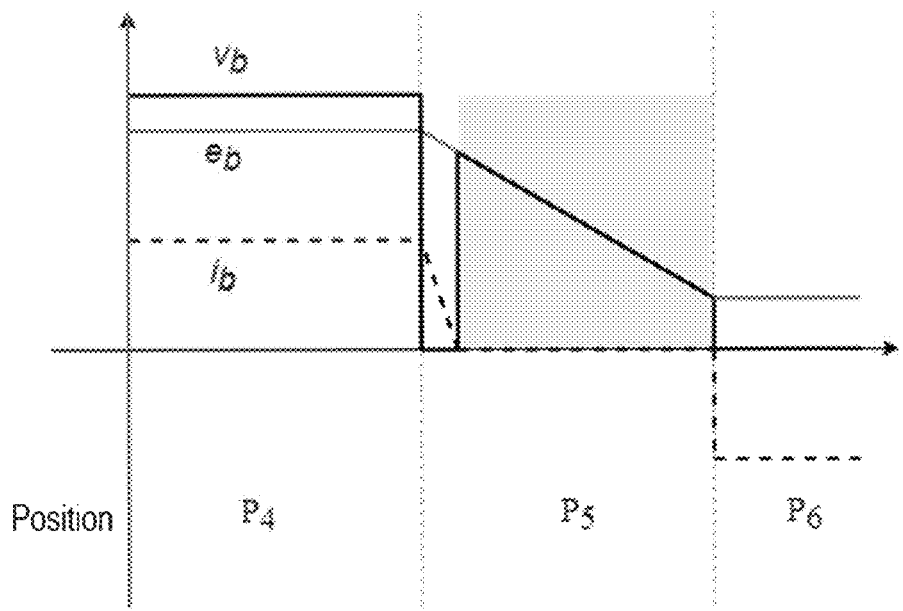
FIG. 5B depicts the clamp of the phase voltage at the reference voltage of the inverter bridge when the residual current enters the motor by the lower freewheel diode of phase B of the prior art.
Figure 6A:
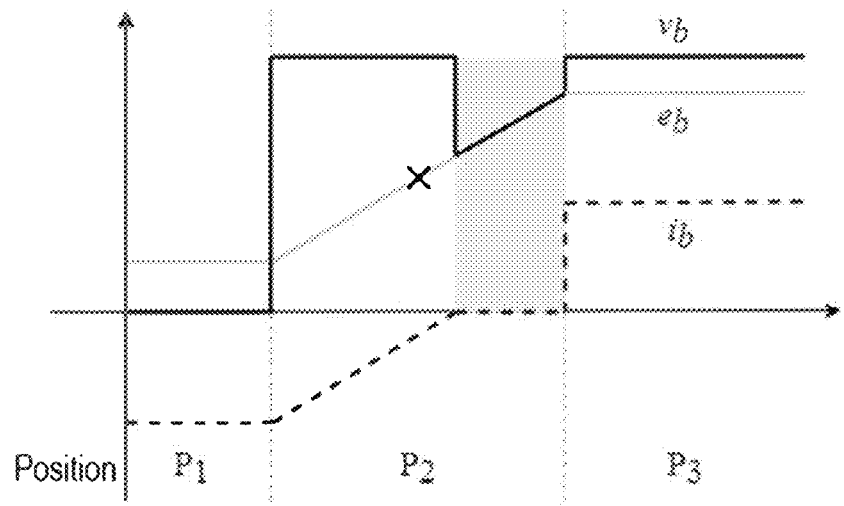
FIGS. 6A and 6B exemplify the loss of the zero crossing due to the extension of the residual current up to its extinction of the prior art.
Figure 6B:
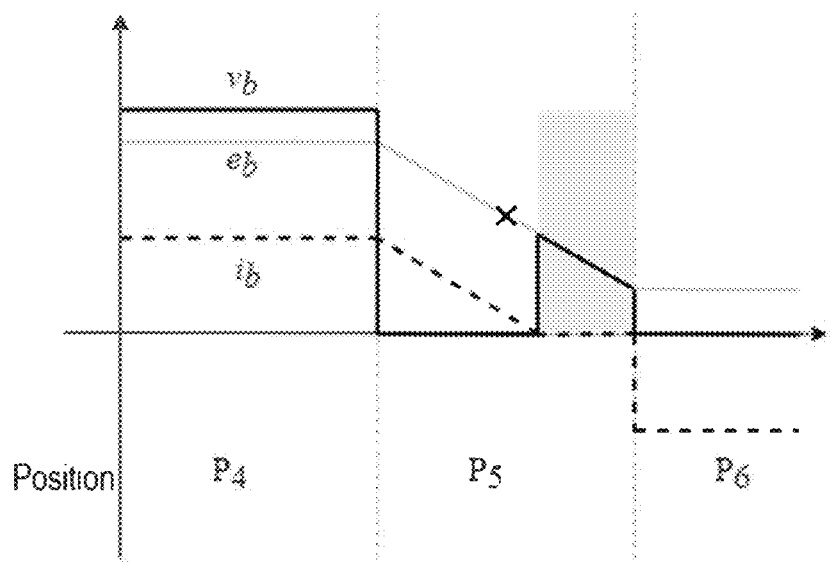
Figure 7:
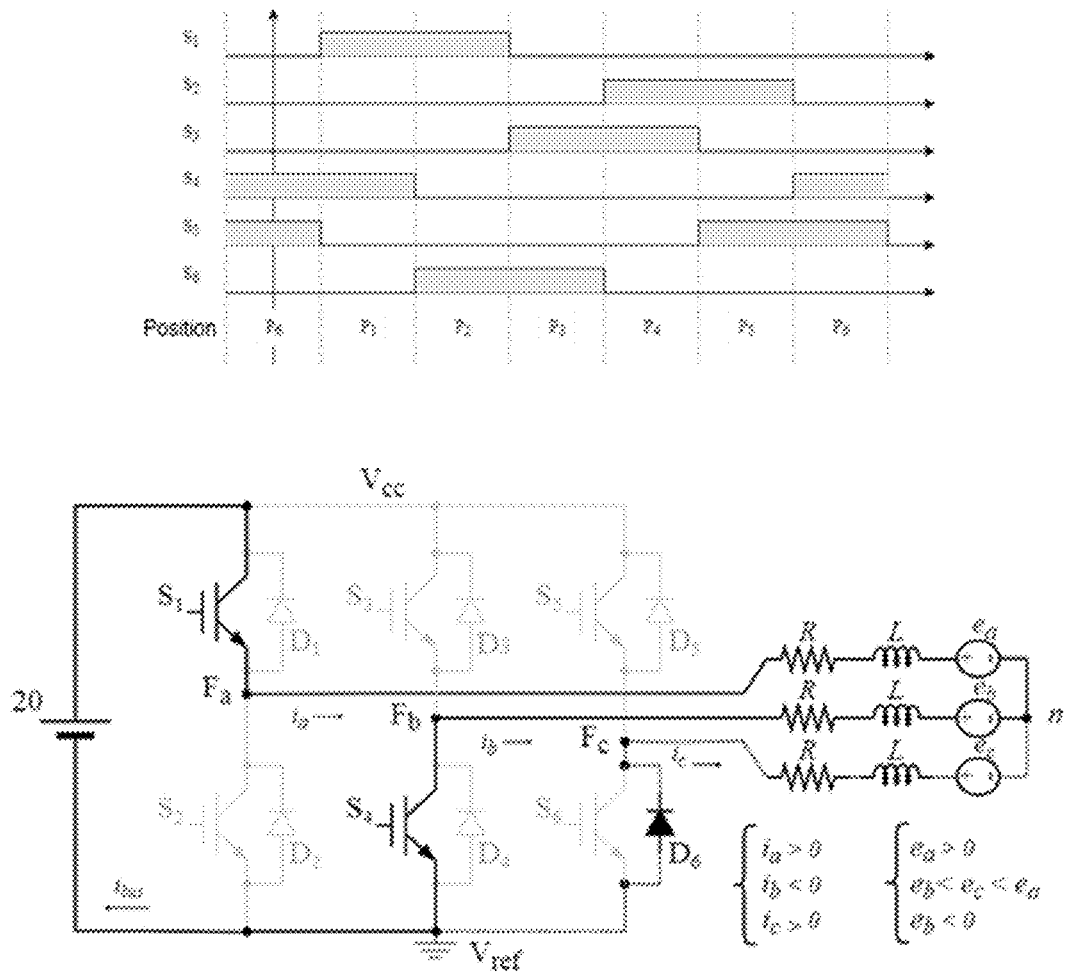
FIG. 7 depicts the transition from the electric position $P_1$ of the BLDC motor in a prior art driving.
Figure 8:
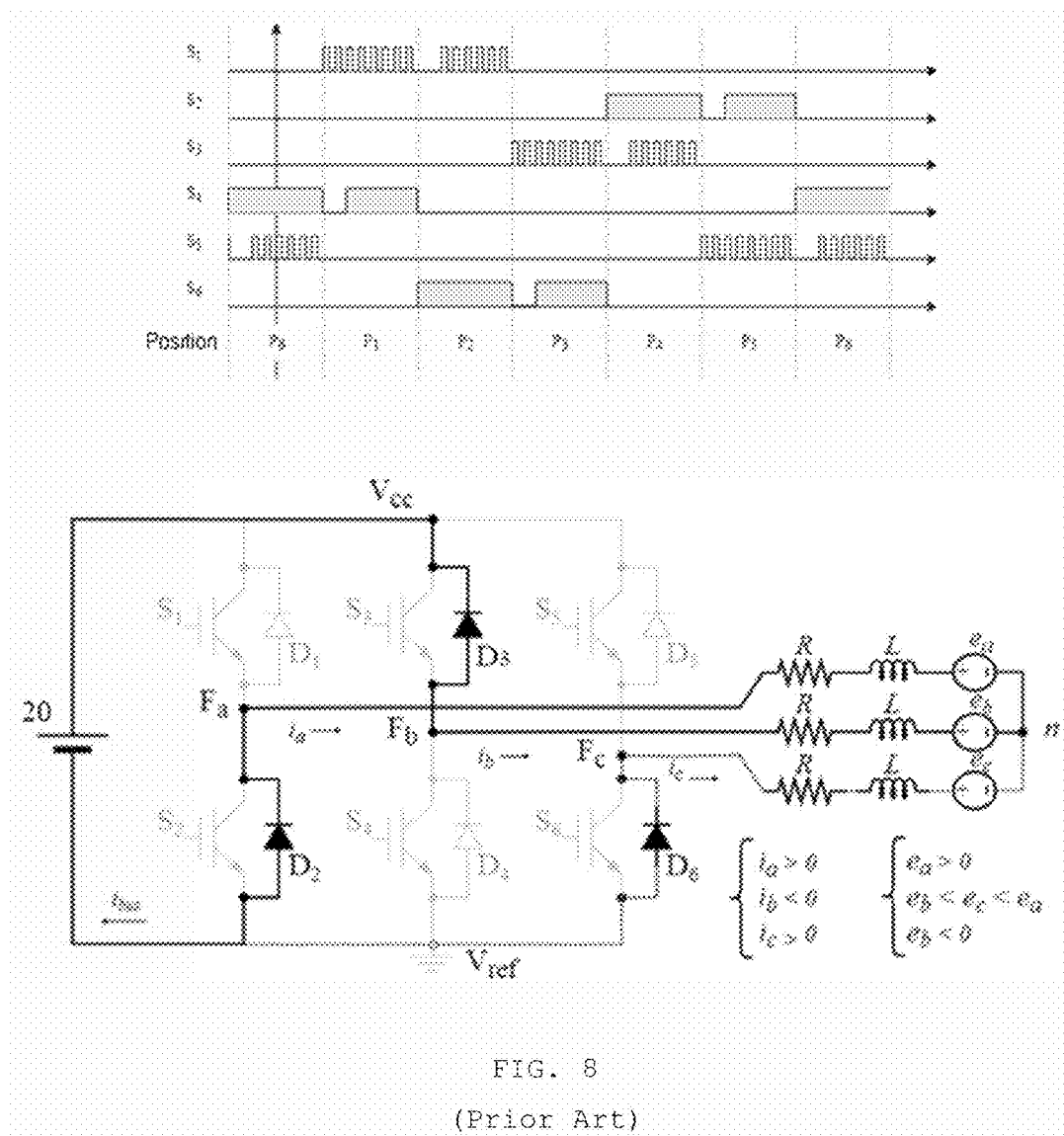
FIG. 8 depicts the transition from the electric position $P_1$ of the BLDC motor in a prior art driving with return of the residual current by the busbar.

For example, in FIG. 4A, the change of position was done between phase B and phase C, phase A is maintained. In this case, the current circulating by the current sensor at the DC busbar is the one of phase C, that is, the phase that was connected in the change of position. In a similar way, in FIG. 5B the current circulating by the current sensor at the DC busbar is also the one of phase C, that is, the phase that was connected in the change of position.

Therefore, the current in the phase maintained connected is not monitored immediately after a change of position, and its amplitude will depend on the current variation rate both of the phase that is entering and the phase that is leaving during the change of position.

Figure 13A:
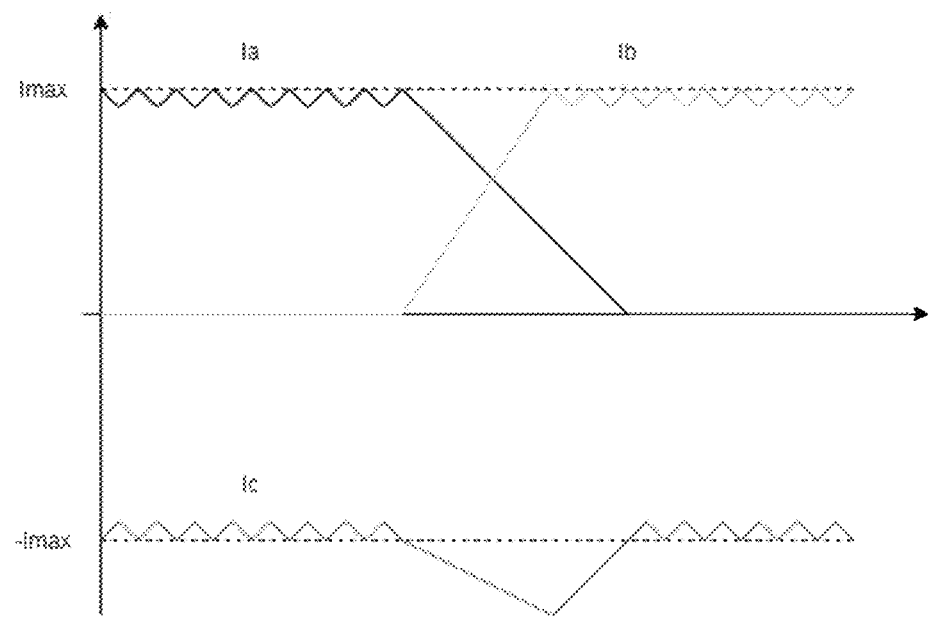
FIGS. 13A and 13B depict possible practical applications of the method according to the present invention.

In the specific case of operating in low speed, as for example at the start of the motor, the current in the phase that is entering goes up fast, while the current in the phase that is leaving takes longer to extinguish due to the low BEMF induced voltage of the motor. The result is that the current in the phase maintained connected ends up escaping and generating a transitory overcurrent during the extinguishing of the residual current, such as shown in FIG. 13A, impairing the protection against overcurrent of the motor.

Figure 13B:
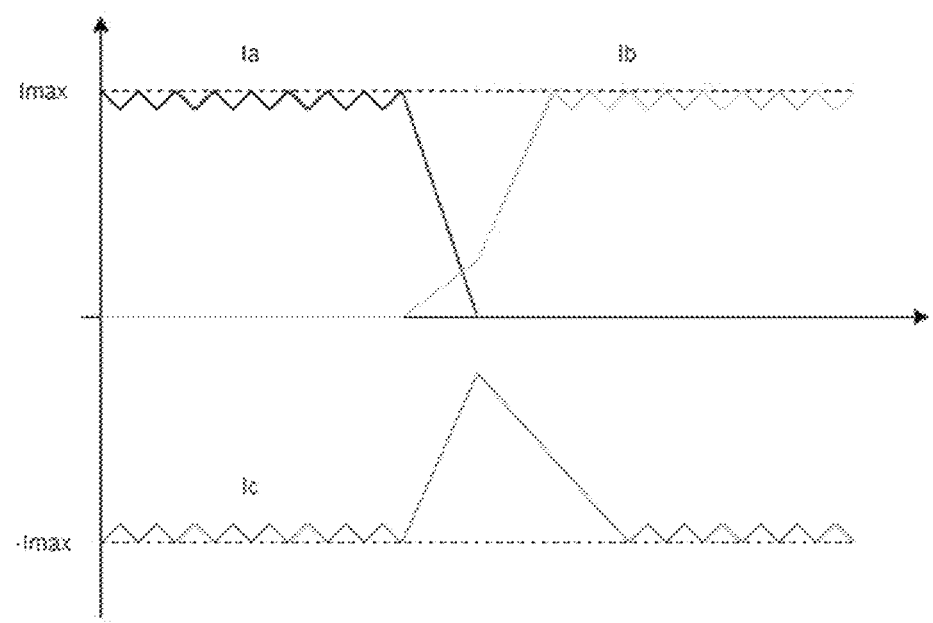

As demonstrated previously, the application of the switching pattern for accelerated extinguishing of the residual current also generates a reduction in the current of the phase maintained during shifting. This way, there is no more overcurrent during the change of position, such as depicted in FIG. 13B, guaranteeing an effective protection of the motor against overcurrents even with one only current sensor in the busbar.

In addition to the embodiments presented previously, the same inventive concept can be applied to other alternatives or possibilities of using the invention. For example, in air compressors and starter motors of vehicles.

Although the present invention has been described in relation to certain preferred embodiments, it should be understood it is not intended to limit the invention to such particular embodiments. On the contrary, it is intended to embrace all the alternatives, modifications and equivalencies possible within the spirit and scope of the invention, as defined by the annexed claims.

The invention claimed is:

1. A method of accelerated extinguishing of residual current of a phase that opens when changing an electric position during the driving of a BLDC motor (10), under high load conditions, characterized in that comprises:
   using the unipolar pulse width modulation pattern ON_PWM to drive the BLDC motor (10);
   determining whether there is residual current by monitoring the voltage of the phases that opens using a voltage observer (40);
   while there is residual current, applying a switching pattern, on the switches ($S_1$-$S_6$) of the BLDC motor (10), which superimposes the pulse width modulation pattern used and maximizes the voltage in the open phase for the accelerated extinguishing of said residual current,
   said switching pattern comprising:
   opening the switch of the phase maintained driven when changing the electric position; and
   closing the switch related to the phase that was driven when changing the electric position.

2. The method, according to claim 1, characterized in that while there is residual current leaving the phase that opens by an upper freewheel diode, the voltage read by the voltage observer (40), of the phase that opens, will be near the busbar voltage ($V_{cc}$) and the switching pattern for the accelerated extinguishing of the residual current is applied.

3. The method, according to claim 1, characterized in that while there is residual current entering through the phase that opens by a lower freewheel diode, the voltage read by the voltage observer (40), of the phase that opens, will be near zero and the switching pattern for the accelerated extinguishing of the residual current is applied.

4. The method, according to claim 1, characterized in that the monitoring of the residual current must be conducted until the complete extinction of such current.

5. The method, according to claim 1, characterized in that the unipolar pulse width modulation pattern ON_PWM can be replaced by any other unipolar or bipolar pulse width modulation pattern.

6. The method of duration control of the method of accelerated extinguishing of residual current as defined in claim 1, characterized in that comprises:
   adjusting a time interval of accelerated extinguishing of residual current ($t_f$) for protecting the electric position sensing.

7. The method, according to claim 6, characterized in that the time interval of accelerated extinguishing of residual current ($t_f$) required depends on a window time interval for reading an induced voltage ($t_j$), a minimum window time interval ($t_{jmin}$) and a time interval of residual current extinguishing ($t_e$).

8. The method, according to claim 7, characterized in that the window time interval for reading a induced voltage ($t_j$) consists of a time interval comprised by the moment wherein the residual current is extinguished up to the moment wherein an electric position of the BLDC motor (10) is detected.

9. The method, according to claim 7, characterized in that the time interval of residual current extinguishing ($t_e$) consists of the time interval comprised by the moment wherein the BLDC motor (10) changes the electric position, and thus a residual current in the phase that opens of said BLDC motor (10) is generated, up to the moment wherein such residual current is extinguished.

10. The method, according to claim 7, characterized in that the time interval of accelerated extinguishing of residual current ($t_f$) can be saturated in its minimum value, that is, zero, and in its maximum value, that is, equal to the residual current extinguishing ($t_e$).

11. The method, according to claim 7, characterized in that the minimum window time interval ($t_{jmin}$) is defined and function of the minimum electric distance ($\Delta\theta_{min}$) that is desired for a safe operation of the electric position sensing and the electric speed ($\omega_e$) of the BLDC motor (10).

12. The method, according to claim 1, characterized in that the increase or decrease of the time interval of accelerated extinguishing of residual current ($t_f$) is defined by comparing the minimum window time ($t_{jmin}$) to the window time interval for reading induced voltage ($t_j$).

13. The method, according to claim 1, characterized in that the application of the switching pattern for accelerated extinguishing of the residual current results in the reduction of the current in the phase maintained turned on during the change of position, avoiding limiting the protection of overcurrent in low speed done by only one current sensor in the busbar, promoting a more effective protection of the BLDC motor (10) against overcurrents.

14. The method, according to claim 1, characterized in that in the beginning of the start of the BLDC motor (10), the time interval of accelerated extinguishing of residual current ($t_f$) must be equal to the time of residual current extinguishing ($t_e$).

* * * * *